July 5, 1938.  P. W. BIDWELL ET AL  2,122,710
COUNTING DEVICE
Filed June 24, 1933  6 Sheets-Sheet 1

INVENTORS
Paul W. Bidwell
George M. Prentice.
BY
Frank E. Haskell ATTORNEY

July 5, 1938.  P. W. BIDWELL ET AL  2,122,710
COUNTING DEVICE
Filed June 24, 1933  6 Sheets-Sheet 2

INVENTORS
Paul W. Bidwell
George M. Prentice
BY
Frank E. Haskell ATTORNEY

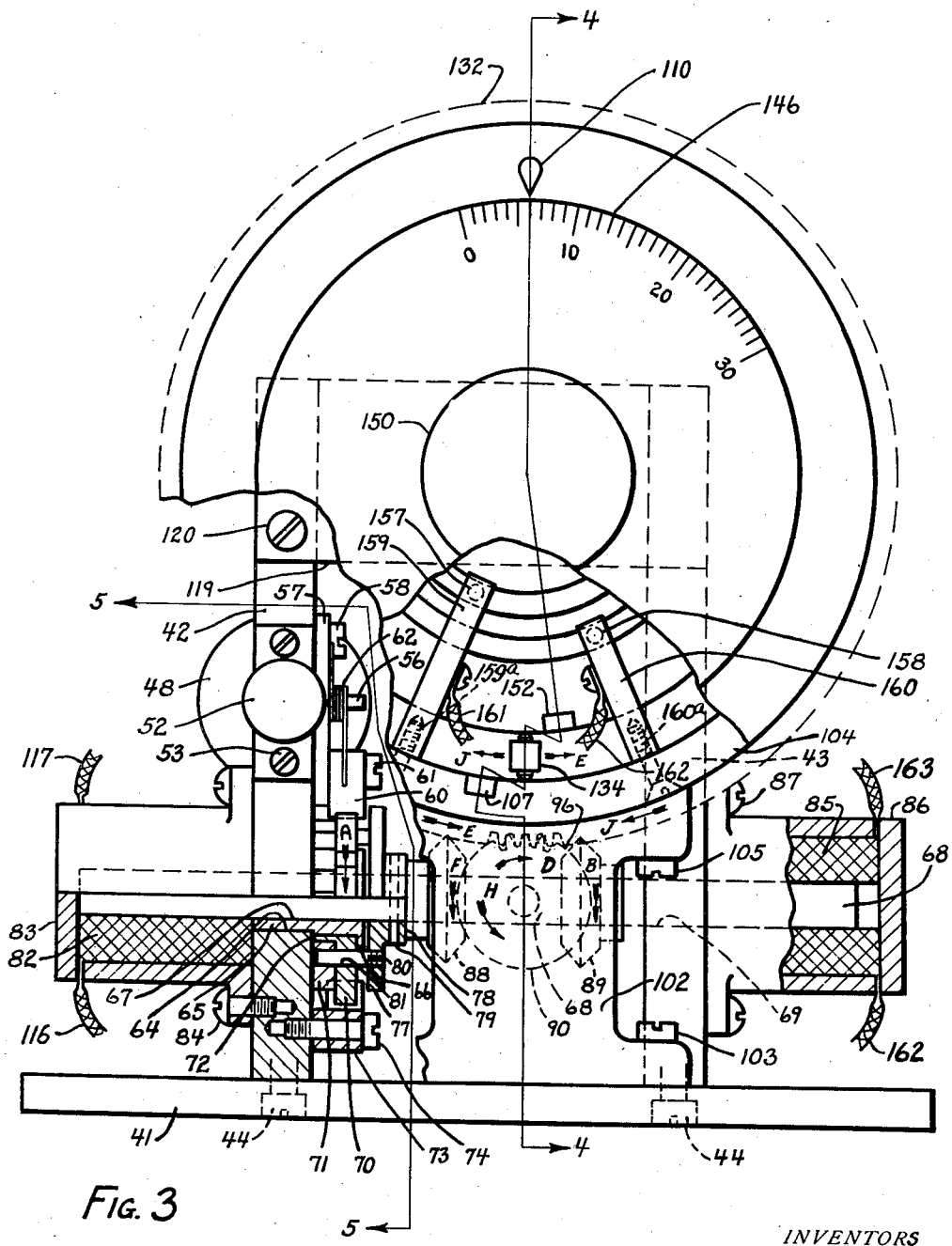

July 5, 1938.   P. W. BIDWELL ET AL   2,122,710
COUNTING DEVICE
Filed June 24, 1933   6 Sheets-Sheet 4
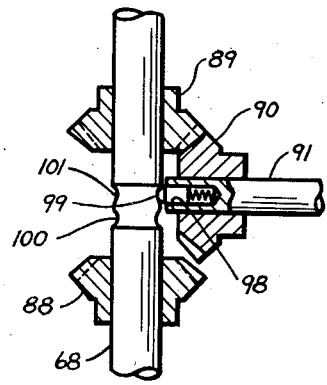
Fig. 7
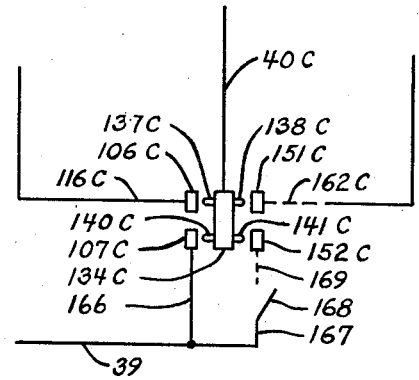
Fig. 10
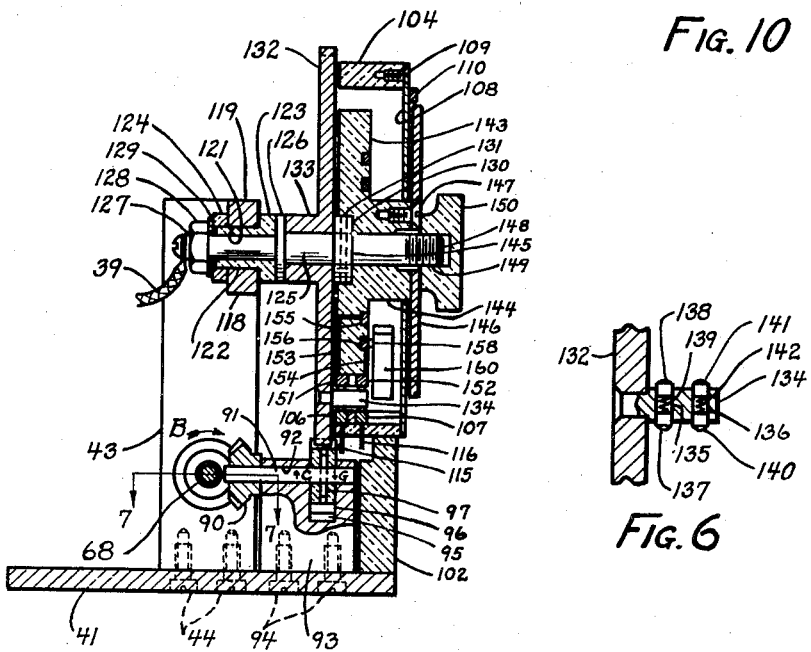
Fig. 4
Fig. 6
INVENTORS
Paul W. Bidwell
George M. Prentice
BY
Frank E. Marshall ATTORNEY July 5, 1938.　　P. W. BIDWELL ET AL　　2,122,710
COUNTING DEVICE
Filed June 24, 1933　　6 Sheets-Sheet 5

INVENTORS
Paul W. Bidwell
George M. Prentice
BY Frank E. Haskell ATTORNEY

Patented July 5, 1938

2,122,710

UNITED STATES PATENT OFFICE 2,122,710

COUNTING DEVICE

Paul W. Bidwell and George M. Prentice, Holyoke, Mass.

Application June 24, 1933, Serial No. 677,449

10 Claims. (Cl. 235—98)

This invention relates to counting apparatus, particularly to apparatus for counting a predetermined number and then giving some indication such as ringing a bell, blowing a horn or lighting a lamp, or causing to be performed some desired operation such as interleaving an index sheet in a pile of paper for blank books or moving a conveyor along a certain distance after a predetermined number of boxes or other articles have been placed in a pile thereon. The character of the work or the type of machine to which the counting apparatus may be applied is not a part of the invention but it is obvious that there are many such uses to which the invention may be applied.

It is one of the objects of the invention to provide apparatus which may be readily set for counting different predetermined numbers and then operating some signal or causing to be performed some operation.

It is also an object of the invention to provide apparatus for repeatedly counting a predetermined number an indefinite number of times.

It is also one of the objects of the invention to provide counting apparatus for repeat or duplicate counting which may be readily set for any specific number to be counted within the capacity of the apparatus.

It is a further object of the invention to provide such apparatus that will be simple in construction, not likely to get out of order, and inexpensive to manufacture.

Another object of the invention is to provide a unitary counting device of such a character that two or more such devices of identical construction may be connected so that one unit will operate another in such a manner as to multiply the range of the numbers that may be counted repeatedly.

These and other objects of the invention will readily appear to those skilled in the art to which it appertains by a consideration of the different embodiments thereof set forth in the following description taken in connection with the accompanying drawings in which Fig. 1 is a more or less diagrammatic view of one embodiment of the invention applied to the delivery end of a paper ruling machine for interleaving a special sheet, such as an index sheet, after a predetermined number of regular sheets have passed through the machine;

Fig. 3 is an elevation, partly broken away, of the counting mechanism, looking toward the setting dial;

Fig. 4 is a sectional view taken on the line 4—4 of Fig. 3 somewhat reduced in scale;

Fig. 6 is an enlarged sectional view of the stud carrying the contact members;

Fig. 7 is a horizontal section taken on the line 7—7 of Fig. 4;

Figure 2:
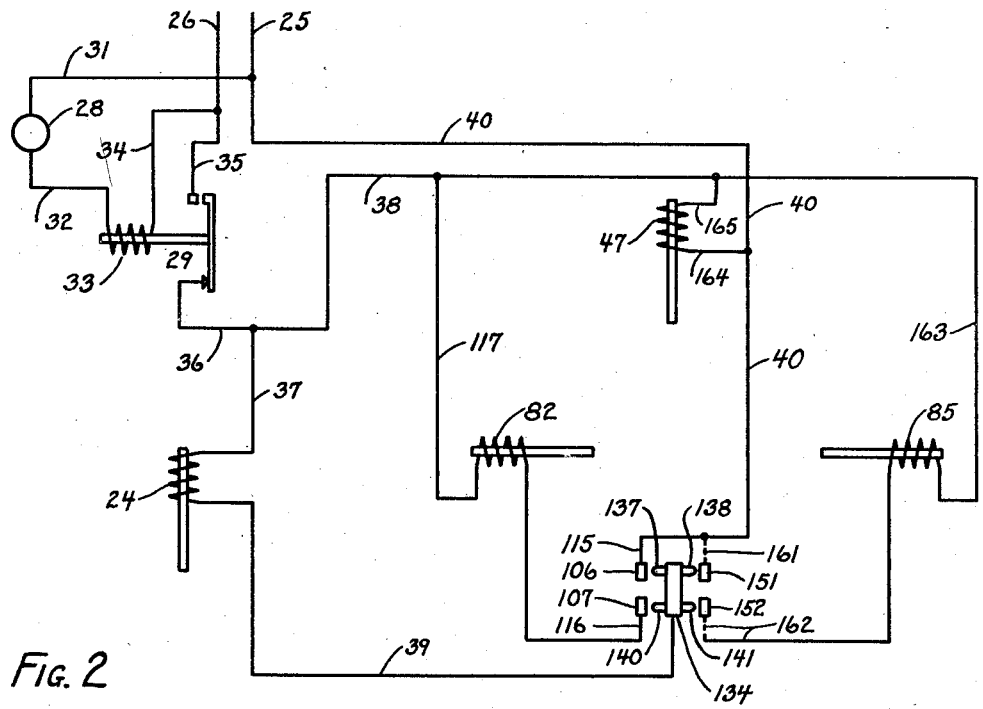
Fig. 2 is a diagrammatic view of the electrical connections of the apparatus shown in Fig. 1.
Figure 9:
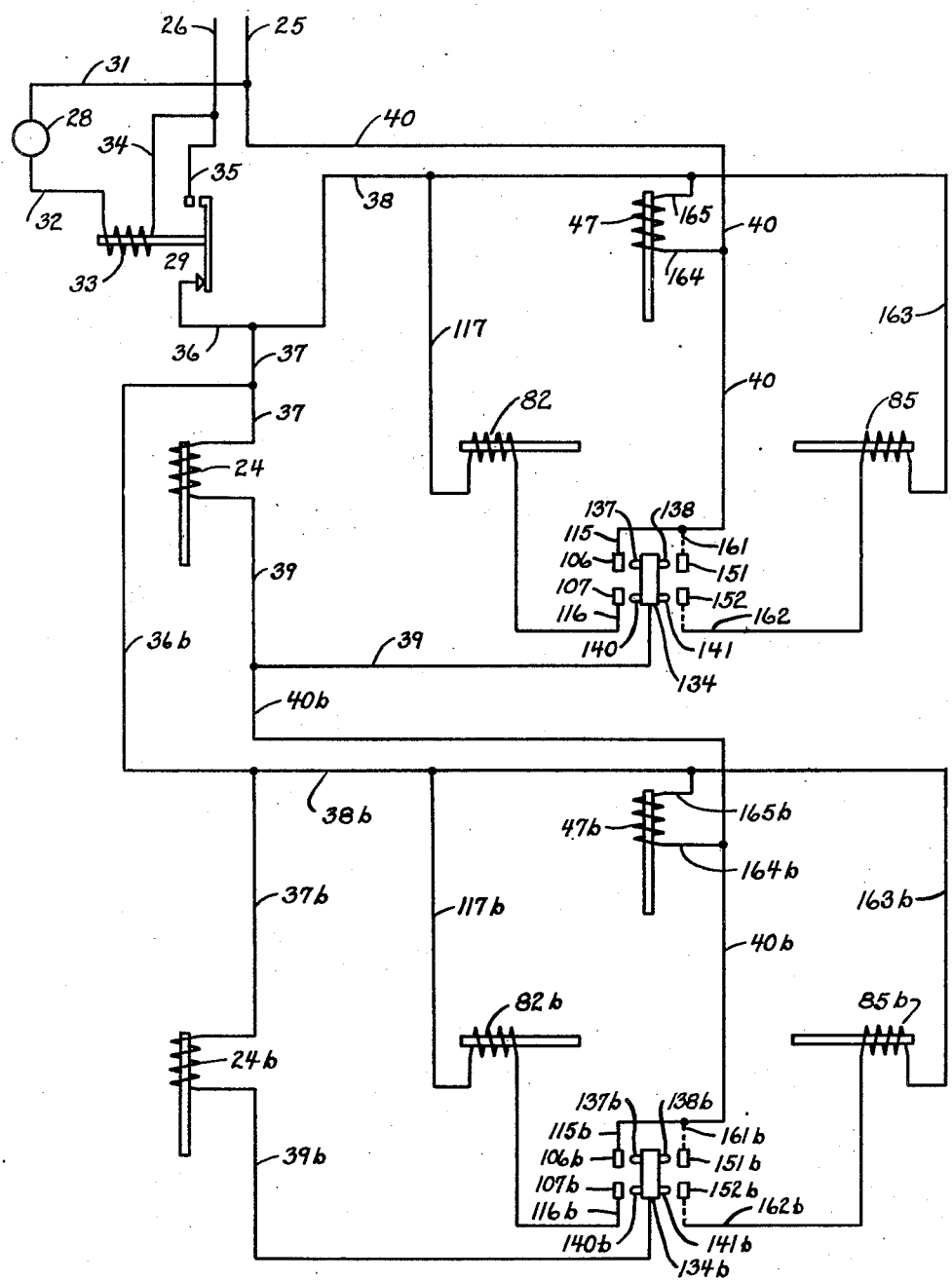

Fig. 9 is a connection diagram illustrating a method of using two counting units for extending their range of duplicate counting and for performing different operations after different predetermined numbers; and Fig. 10 is a diagrammatic view of a modified form of the electrical connections, similar to Fig. 2 omitting the showing of a large portion of the connections which are unchanged from Fig. 2, and enables double the number of operations to be counted between operations of the interleaving mechanism by merely opening a switch.

Figure 1:
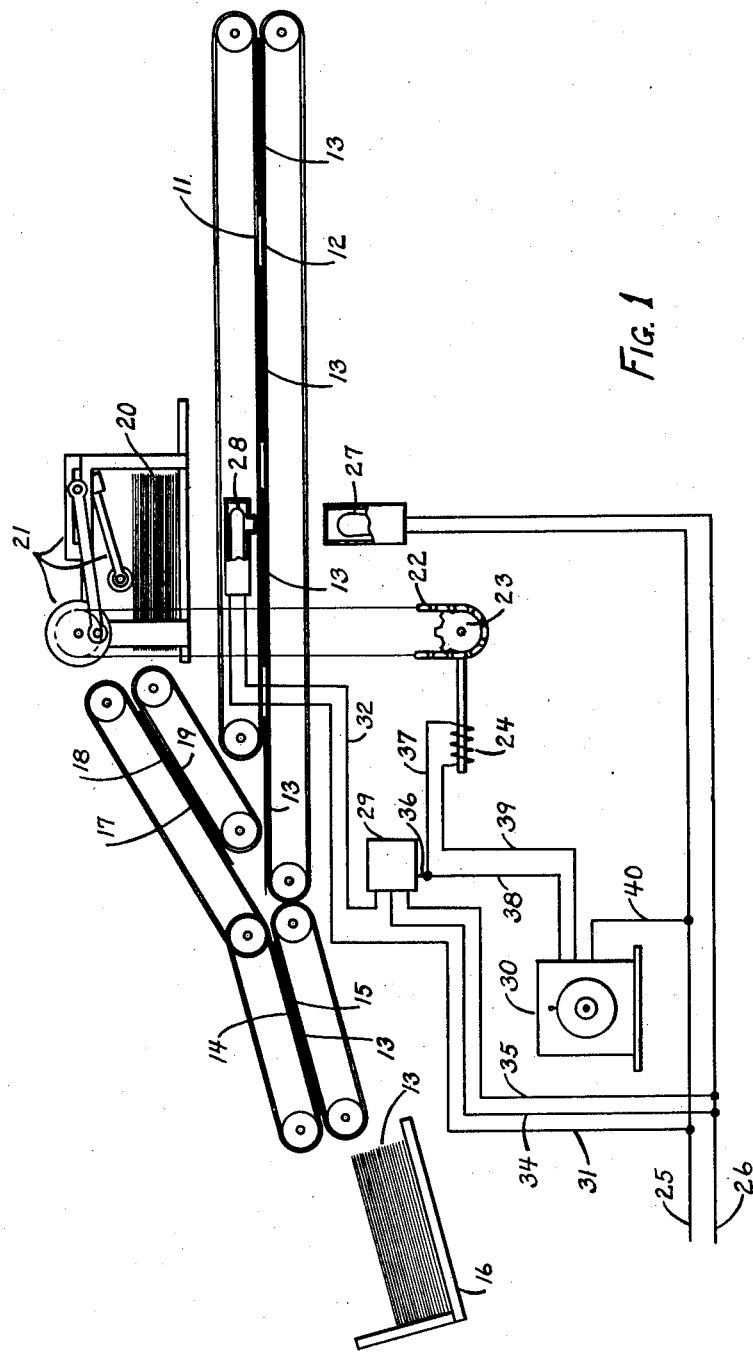

Referring to the drawings more in detail the reference numerals 11 and 12 (Fig. 1) indicate upper and lower tapes respectively for carrying successive sheets of paper 13 from a ruling machine, not shown, and discharging them into a second set of upper and lower conveyor tapes 14 and 15 respectively. This last conveyor carries the successive sheets to the end of the machine and discharges them onto a pile or stack which is also sometimes called a layboy and is indicated by the numeral 16. An arrangement is shown for delivering a sheet of a different kind of paper such as an index sheet 17 after a predetermined number of the sheets 13 have passed along the conveyor. Auxiliary conveyor tapes 18 and 19 are provided for this purpose which tapes receive an index sheet 17 at the proper time from a pile or stack indicated at 20. Suitable mechanism, indicated generally at 21, may be provided for feeding one sheet of the index sheets at a time. The particular type of feeding mechanism employed is not described in detail as it is not a part of the invention and any other suitable type may be substituted therefor. The feeding mechanism is shown as operated by a sprocket chain 22 driven by a sprocket wheel 23. A suitable clutch, not shown, may be provided for throwing the sprocket wheel 23 into operation for a sufficient length of time to cause the feeding of one of the sheets 17. A solenoid 24 is arranged to be periodically energized and is connected by any suitable mechanism for operating the clutch.

Photo-electric means are provided for counting the sheets 13 as they pass along the conveyor. Line conductors 25 and 26 are connected to any suitable source of power and supply energy to a lamp 27 positioned below the conveyor 11—12. A photo-electric cell 28 is positioned above the conveyor directly above the lamp 27. If the energy change in the photo-electric cell is great enough it may be employed to operate the counting device directly or it may, as shown in the drawings, operate a relay indicated generally at 29. In connecting the relay to the photo-electric cell and to the counter, indicated generally at 30, a conductor 31 is employed for joining the conductor 25 to one side of the cell 28. The other side of the cell is connected by a conductor 32 to one terminal of a solenoid 33 (see Fig. 2) which operates the relay. The other terminal of the solenoid is connected by means of a conductor 34 to the line conductor 26. A conductor 35 also connects the line conductor 26 to one of the contact terminals of the relay. A conductor 36 is connected to the other contact terminal of the relay and has two branches, one conductor 37 being connected to one terminal of the solenoid 24 and the other conductor 38 being connected to the counter 30. A conductor 39 is connected from the remaining terminal of the solenoid 24 to the counter 30 and there is also a conductor 40 from the line conductor 25 to the counter 30. The detailed description of the connections inside the counter will be given in connection with the description of the structural features of the counter.

The counter is provided with a base 41 from which there extends upwardly a pair of supporting standards 42 and 43. These may be formed integral with the base or they may be secured thereto by any suitable means such as screws 44. The standard 42 is shown with an aperture 45 therethrough which may conveniently be in the form of a bored hole and cylindrical. Positioned within the aperture 45 and extending outwardly beyond the standard 42 at both sides thereof is a magnetic plunger 46. Positioned concentrically around the plunger 46 where it extends beyond the standard 42 at one side is a solenoid or electromagnet 47. A cap or casing 48 is formed to fit around the electromagnet 47 and is secured to the standard 42 by any suitable means as screws 49.

The other end of the plunger 46 which protrudes from the aperture 45 at the other side of the standard 42 is provided with a collar 50 which may be integral therewith or secured thereto. A compression spring 51 is positioned between the collar 50 and the side of the standard 42. A cap or casing 52 covers the spring and may be secured to the standard 42 by screws 53. It will be noted that when the electromagnet 47 is not energized the spring 51 withdraws the plunger 46 from the electromagnet 47 sufficiently to give the clearance indicated at 54 and when the electromagnet 47 is energized the plunger is drawn within the electromagnet to reduce this clearance.

A slot 55 is provided in the standard 42 and extends in the same longitudinal direction as the movement of the plunger 46. A pin 56 is positioned in the slot 55 and extends into the plunger 46 so as to move therewith, sliding back and forth in a horizontal direction as the plunger moves back and forth in a horizontal direction.

An arm 57 is pivoted to the standard 42 by a pivot screw 58 and has therein a vertically extending slot 59 to receive loosely the pin 56. A pawl 60 is pivoted to the arm 57 by a pivot screw 61. A spring 62 holds the pawl 60 against a ratchet wheel to be hereinafter described. The lower end of the arm 57 is provided with a detent 63 for a purpose which will be more fully described hereinafter.

The standard 42 is provided with a second aperture 64 positioned below the aperture 45, extending in a horizontal direction and at right angles to the aperture 45. A shouldered bushing 65 is pressed into this aperture and has thereon a flange 66. The inside of the bushing 65 provides a bearing 67 for a shaft 68 which also extends into an aperture or bearing 69 provided in the standard 43. Rotatably mounted on the bushing 65 is a ratchet wheel 70 which is driven by the pawl 60. A detent wheel or locking wheel 71 is mounted so as to rotate with the ratchet wheel 70. As shown in the drawings the wheel 71 is pressed on a hub 72 extending from the wheel 70. The combined thickness of the ratchet wheel 70 and the detent wheel 71 is slightly less than the distance between the flange 66 and the standard 42 so that the wheels are free to rotate but have only a very limited longitudinal movement. To prevent reverse movement of the ratchet wheel 70 a pawl 73 is mounted on the standard 42 by means of a screw or pivot 74 and is held in contact with the ratchet wheel by means of a spring 75 secured to the standard 42 by means of a screw 76. To permit longitudinal movement of the shaft 68, as will be hereinafter described, while constraining it to rotate it with the ratchet and detent wheels 70 and 71 the following mechanism is provided. An annular disc 77 has a hub 78 which is secured to the shaft 68 as by means of a pin 79. The disc 77 is provided with a plurality of pins 80 which extend into apertures 81 in the ratchet and detent wheels. The pins fit loosely in these apertures so that they slide readily into and part way out of the apertures with the longitudinal movement of the shaft and at the same time they constrain the wheels 70 and 71 to rotate with the disc 77 and shaft 68.

A solenoid 82 is positioned around the shaft 68 where it extends beyond the standard 42 and, when energized, pulls the shaft outward until it strikes the end of a casing 83 which surrounds the solenoid and shaft and is secured to the standard 42 by any suitable means such as screws 84. A similar solenoid 85 is positioned around the shaft 68 where it extends beyond the standard 43 and, when energized, pulls the shaft outward until it strikes the end of a casing 86 which surrounds the solenoid and shaft and is secured to the standard 43 by any suitable means such as screws 87. Bevel gears 88 and 89 are secured to the shaft 68 and mesh alternately, depending on which solenoid 82 or 85 has last been energized, with a bevel gear 90 secured to a shaft 91 rotatably mounted in bearings 92 provided in a standard 93 secured to the base 41 by screws 94. The standard 93 is provided with a slot or opening 95 for the reception of a spur gear or pinion 96, formed from an electrically insulating material and secured to the shaft 91 by a pin 97. This positioning of the gear or pinion 96 in the slot 95 prevents longitudinal movement of the shaft 91. The end of the shaft 91 is provided with a recess 98 (see Fig. 7) for the reception of a spring pressed pin 99 which rests in an annular groove 100 or in an annular groove 101 on the shaft 99 depending upon which solenoid has last operated and which bevel gear is in mesh and thereby prevents accidental longitudinal displacement of the shaft 68.

The counting and setting mechanism proper is supported on a pedestal 102 secured to the base 41 by means of screws 103. This pedestal in turn supports a ring 104 which is secured thereto by screws 105. The ring 104 is preferably constructed of material that is an electrical non-conductor such as fiber or Bakelite. A pair of metallic contacts 106 and 107 are set in the fiber of the ring 104. The ring 104 also carries a plate 108 which is secured thereto by screws 109 and the plate carries an index member 110 for indicating the exact position of a dial to be subsequently described. The contacts 106 and 107 are connected by conductors 115 and 116 respectively to the line conductor 40 and to one terminal of the solenoid 82. The other terminal of the solenoid 82 is connected by a conductor 117 to the conductor 38 as best seen by reference to Fig. 2.

The standards 42 and 43 are notched or recessed as indicated at 118 for the reception of a crosspiece 119 which is held in place by any suitable means such as screws 120. The cross-piece 119 is provided with an aperture 121 which is cylindrical in form and coaxial with the ring 104. An insulating bushing 122 having a flange 123 is positioned in the aperture 121 with the flange on the side of the cross-piece 119 nearest to the ring 104. A washer 124 of insulating material such as fiber is positioned around the bushing 122 on the opposite side of the cross-piece and serves to insulate the aperture completely from a metallic supporting stud 125 positioned therein. The external conductor 39, hereinbefore described, is connected to this stud 125. There may be integrally formed on the stud 125 a flange 126 and the end 127 of the stud may be threaded for the reception of a nut 128 for holding the stud rigidly in the cross-piece 119. If desired a metallic washer 129 may be interposed between the nut 128 and the fiber insulating pieces 122 and 124. A collar 130 is secured to the stud 125 by means of a pin 131. A metallic spur gear 132 having a hub 133 is rotatably mounted on the stud 125 and is kept from longitudinal movement by the flange 126 and the collar 130. This gear meshes with the fiber gear 96. Extending from the side of the gear 132 is a metallic stud 134 having two apertures 135 and 136 therein. (See Fig. 6.) The aperture 135 has two contact members 137 and 138 which are pressed outwardly by a compression spring 139 and the aperture 136 has similarly two contact members 140 and 141 which are pressed apart and outwardly by a spring 142. It is to be noted that the contact members 137, 138, 140 and 141, the stud 134, the gear 132 and the supporting stud 125 are all connected electrically since these parts are all constructed of metal. An annular insulating disc 143 having a hub 144 is recessed at 145 to fit over the collar 130. The hub 144 of the disc has an index dial 146 secured thereto by means of screws 147. The end 148 of the supporting stud 125 is threaded as indicated by the reference character 149 so that a knurled nut 150 may be used for clamping the disc 143 and index dial 146 firmly in any adjusted position on the shaft 125. The disc 143 is also provided with contacts 151 and 152 similar to the contacts 106 and 107 and are connected respectively by conductors 153 and 154 to collector rings 155 and 156 which are in contact with brushes 157 and 158 and through brush holder arms 159 and 160 with the conductors 161 and 162. (See Fig. 3.) The brush holder arms are held in place on the inner curved surface of the fiber ring 104 by means of screws 159a and 160a. The conductor 161 is connected to the line conductor 40 (Fig. 2) and the conductor 162 is connected to one terminal of the solenoid 85, the other terminal of the solenoid being connected by means of a conductor 163 to the conductor 38. A conductor 164 connects one terminal of the magnet 47 to the line conductor 40 and a conductor 165 connects the other terminal of the magnet 47 to the conductor 38.

To set the device for counting a different number the knurled nut 150 may be loosened, the disc 143 and index dial 146 rotated on the supporting stud the desired angular distance, and the nut 150 again clamped down to hold the disc 143 in place on the supporting stud 125. As seen in Fig. 3 the disc 143 has been rotated 6 divisions, which shows as 6 divisions on the dial and also spaces the contacts 151—152 a distance corresponding to six notches away from the contacts 106—107. The travel of the gear 132 and the stud 134 will therefore be six impulses in moving from the contacts 106—107 to the contacts 151—152 or from the contacts 151—152 to the contacts 106—107.

Figure 5:
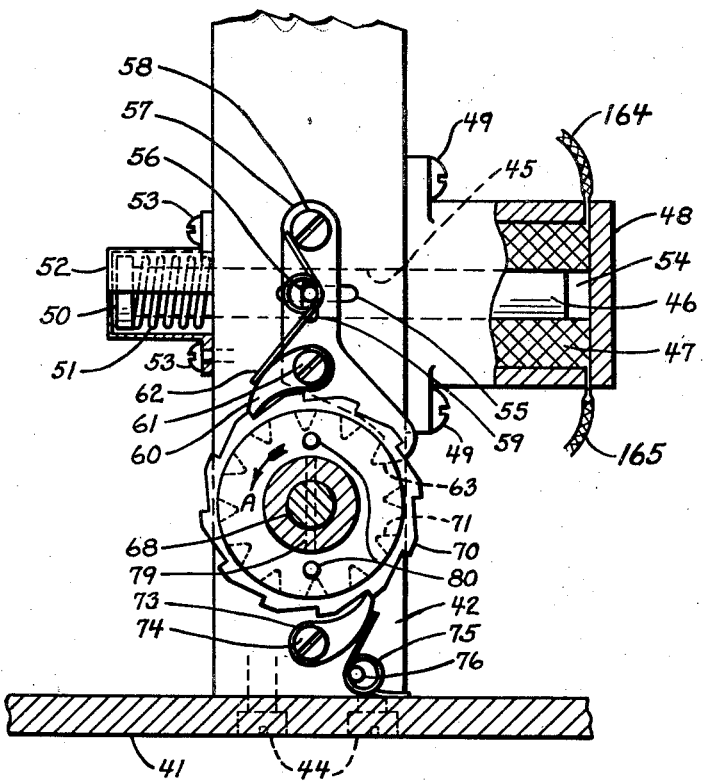
Fig. 5 is a section, partly broken away, taken on the line 5—5 of Fig. 3.

In operation the lamp 27 is lighted continuously but is prevented from shining directly on the photo-electric cell 28 whenever one of the sheets of paper 13 is interposed between the lamp and cell. As the interposed sheet passes out of the interposed position and before another sheet reaches such a position the photo-electric cell is momentarily exposed to the rays of light from the lamp 27 and current is permitted to flow through the circuit 25—31—28—32—33—34—26 of which circuit the photo-electric cell is the controlling element and the solenoid 33 is the operating element. The energization of the solenoid 33 of the relay 29 closes the contacts of the relay. One of the circuits completed by the closing of these contacts is the circuit 25—40—164—47—165—38—36—35—26. The energization of the solenoid or electromagnet 47 draws the plunger 46 toward the right, as seen in Fig. 5, against the force of the compression spring 51. The pin 56 is also carried toward the right and, pressing against the side of the slot 59 in the arm 57, moves the arm 57 toward the right around the pivot 58. The pawl 60 which is carried by the arm 57 is also moved toward the right and drops in behind the next tooth of the ratchet wheel 70. During this movement the detent 63 is moved out of mesh with the detent wheel 71 so that at the extreme right-hand position of the parts the detent wheel and ratchet wheel, which rotate together, are free from any restraint from the detent 63. During this movement the pawl 73 prevents any backward movement of the ratchet wheel 70.

When the next sheet of paper 13 is interposed between the lamp 27 and the photo-electric cell 28 the current flowing through the cell 28 ceases, the relay solenoid 33 is deenergized, the contacts of the relay are opened, the circuit through the electromagnet 47 is opened and it is consequently deenergized so that the pull on the plunger 46 ceases and the spring 51 returns the plunger to the extreme left-hand position. The pawl 60 thereby moves the ratchet wheel 70 one tooth in a counter-clockwise direction as seen in Fig. 5. As the movement toward the left nears its completion the detent 63 settles into one of the depressions of the detent wheel 71 and effectually prevents the impetus of the movement from carrying the ratchet wheel 70 more than the one tooth intended. The rotation of the ratchet wheel 70 step by step also rotates the shaft 68 by means of the pins 80 carried by the annular disc 77. The longitudinal position of the shaft 68 is always in either of one of the two extreme positions so that one and only one of the gears 88 or 89 meshes with the bevel gear 90. As shown in Fig. 3 it is the bevel gear 89 which is in mesh with the bevel gear 90.

In the foregoing relationship of the parts the operation is as follows. The ratchet wheel 70 always rotates in the direction indicated by the arrow A in Fig. 5, and the face of the ratchet wheel is moving in the direction of the arrow A in Fig. 3. The shaft 68 and the bevel gear 89 are being moved in the direction of the arrow B of Fig. 3, and also in the direction indicated by the arrow B in Fig. 4. The bevel gear 90 and the shaft 91 are therefore driven in the direction indicated by the arrow C in Fig. 4. The spur gear or pinion 96 being carried on the same shaft as the bevel gear 90 is rotated in the direction indicated by the arrow D in Fig. 3. The gear 96 drives the gear 132 step by step in the direction indicated by the arrow E in Fig. 3 and the stud 134 is also rotated in the direction indicated by the arrow E in Fig. 3.

It will be noted by referring to Fig. 3 that the position of the stud 134 is such that the contact members carried thereby are not making contact with either the contacts 106—107 or with the contacts 151—152. When this relationship of the parts exists the counting of one item by the photoelectric cell simply ratchets the ratchet wheel 70 one tooth and moves the stud 134 one step forward. When the stud 134 carried by the gear 132 is one step away from the contacts 151—152 the operation of the next impulse takes place as follows. The electromagnet 47 is energized as hereinbefore described but except for the plunger 46 no movement takes place. The relay then opens, the current ceases, and as all the circuits become dead the spring 51 actuates the mechanism to move the stud so as to complete the circuit through the contacts 151—152.

In this position the contact member 138 makes connection with the contact 151 and the contact member 141 which is also in electrical contact with the contact member 138 through the metallic stud 134, makes connection with the contact 152. The conductors 39, 161 and 162 are thus electrically connected. The next impulse which operates the relay completes three sets of circuits and causes three sets of operations, the mechanical operation of two circuits taking place during the flow of current and the mechanical operation of the other circuit taking place chiefly after the current has ceased to flow.

As before described one circuit is 25—40—164—47—165—38—36—35—26. The electromagnet 47 retracts the plunger 46 but for the moment no further operation takes place. Another circuit is established through 25—40—161—151—138—134—141—152—162—85—163—38—36—35—26. The energization of the solenoid 85 draws the shaft 68 toward the right as seen in Fig. 3 and disconnects the bevel gear 89 from the bevel gear 90 and at the same time brings the bevel gear 88 into mesh with the bevel gear 90. Another circuit completed along with this last-named circuit is the circuit 25—40—161—151—138—134—38—24—37—36—35—26. The solenoid 24 sets into operation the clutch for connecting the sprocket wheel 23 and feeds one sheet of index paper 17 from the pile 29.

Upon the opening of the relay and the cessation of current flow the spring 51 pulls the plunger toward the left as seen in Fig. 5 and ratchets the wheel 70 one tooth in the direction indicated by the arrow A of Fig. 5. The bevel gear 88 is rotated in the direction indicated by the arrow F of Fig. 3 and the bevel gear 90 and shaft 91 is rotated in the reverse direction to its previous rotation or as indicated by the arrow G of Fig. 4. The spur gear or pinion 96 is rotated in the direction indicated by the arrow H of Fig. 3 and the gear 132 in the direction indicated by the arrow J. The stud 134 is carried along with the gear 132 in the direction J, and away from the contacts 151 and 152. Further step by step movement of the gear 132 will move the stud 134 toward the contacts 106—107. When they are reached a similar operation to that just described takes place in which the solenoid 82 is energized and reverses the gears 88, 89 and 90 and at the same time causes another energization of the solenoid 24 to feed another sheet of index paper. As already set forth the number of impulses to be counted before a reversal and an operation of the solenoid 24 may be readily changed at any time and with the parts in any position. It is not necessary for any particular position to be reached in order to change the setting of the number to be counted.

It should be noted, however, that if the setting is changed in certain positions of the device the first batch of articles run off will not be accurate. The preferable time to change the setting, if it is desired to have each batch of a definite quantity, and of exactly either the prior or subsequent number, is just after contact has been made with the stationary contacts, i. e., with the contacts 106—107. If this is important a red light or other signal may be connected in the circuit of the stationary contacts in much the same way as the contacts at one end of the travel of the movable member may have a switch connected therein as is hereinafter more fully explained in connection with Fig. 10. In general, if the gear 132 and the stud 134 are moving toward the stationary contacts the batch then being counted will be completed according to the old setting and thereafter each subsequent batch will be counted according to the new setting. If the gear 132 and the stud 134 are moving toward the movable contacts on the disc 143 and the setting is from a lower to a higher number the batch then being counted will be counted in accordance with the new setting. If the setting is made from a higher to a lower number but not as low a number as the number that has been counted up to that moment the same thing would be true. However, if the gear is moving toward the contacts on the disc and has reached a count greater than the new setting then, if the setting movement sweeps by the contacts during a moment when they are dead then the gear 132 and the stud 134 will continue to be actuated step by step in the same direction until they have made a complete revolution. If the setting movement of the contacts on the disc 143 is at a moment when the contacts are alive and is sufficiently prolonged in time as they pass the contacts on the gear to cause an operation then the gear will be reversed having completed a batch of just the quantity that happened to correspond to its position at that moment, and the very next batch have exactly the same number.

Figure 8:
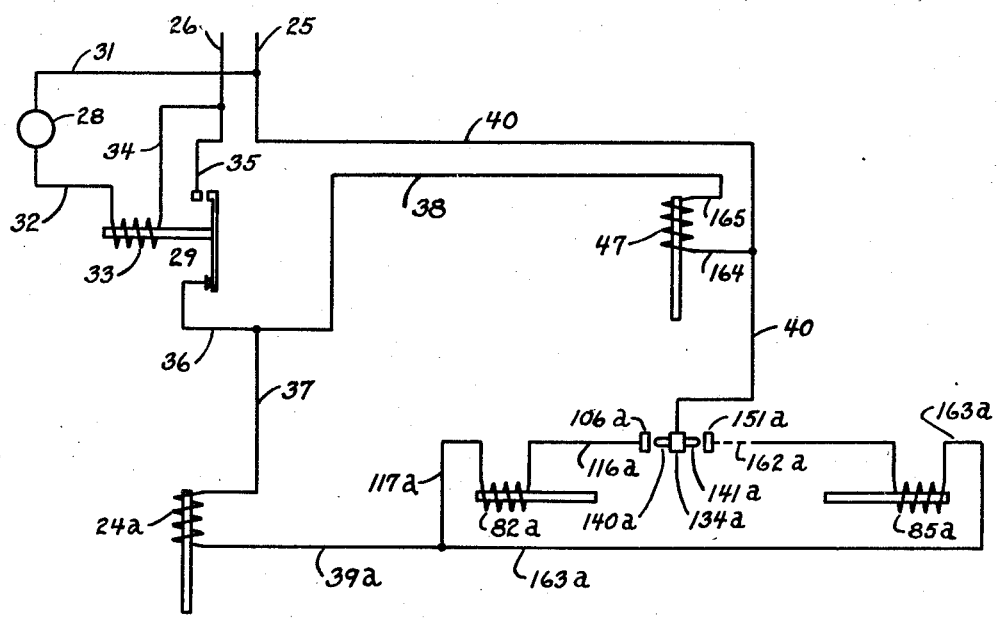
Fig. 8 is a diagram of connections adapted to be used with a modified form of counting mechanism.

In the modification shown in Fig. 8 there is provided a stud 134a which carries only one contact member 141a for making contact in the forward direction with only one contact 151a carried by the annular insulating disc 143. The ring 104 also carries only one contact 106a for cooperation in the reverse direction, with a single contact member 140a carried by the stud 134a. The conductor 40 is connected to the stud 134a. The contact 151a is connected by means of a conductor 162a to one terminal of a solenoid 85a. The other terminal of the solenoid 85a is connected by means of a conductor 163a to a conductor 39a. The contact 106a is connected by a conductor 116a to one terminal of a solenoid 82a, the other terminal of which solenoid is connected by a conductor 117a to the conductor 39a. The conductor 39a is connected to one terminal of a solenoid 24a. The other terminal of the solenoid 24a is connected to the conductor 37.

In the operation of the modification shown in Fig. 8 let it be assumed that the position of the parts is such that the contact member 141a makes connection with the contact 151a. One of the circuits through which current will then flow is 25—40—134a—141a—151a—162a—85a—163a—39a—24a—37—36—35—26. The current therefore flows in series through the solenoid 85a and the solenoid 24a. In the form shown in Fig. 2 the current flows in parallel through the solenoid 85 and the solenoid 24. In both cases the two solenoids are simultaneously energized and the mechanical operation of the two devices is precisely the same. At the other extreme position of the stud 134a a similar series circuit is provided, namely, 25—40—134a—140a—106a—116a—82a—117a—39a—24a—37—36—35—26 by virtue of which the solenoids 82a and 24a are simultaneously energized.

In the arrangement shown in Fig. 9 two counting devices which have identically the same mechanism as the device shown in Fig. 2 are connected together. Reference characters using numerals without a suffix letter are employed to designate the connections of the first device and reference characters using numerals with the suffix "b" are employed to designate the connections of the second device. The first device is connected as before with a photoelectric cell 28 and a relay 29. The second device has its conductor 40b connected to the conductor 39 of the first device and has its conductor 36b connected with the conductor 37 of the first device. This results in the circuit which energizes the solenoid 24 also energizing the main conductors 40b and 36b of the second device. The first device is operated every time the relay operates. The second device is operated every time the solenoid 24 is operated.

The operation of the arrangement shown in Fig. 9 can best be explained by assuming that the first device is set for counting some specific number, as for example 15, and the second device is set for counting some other specific number such as 20. At each count of 15 the solenoid 24 is energized and also the second device is energized which accordingly ratchets ahead one tooth. When the first device has counted 15 for twenty different times the second solenoid 24b will be energized and the direction of rotation of the second device will be reversed as has already been described for a single counting device. The solenoid 24b and any mechanism associated therewith will therefore be operated once for every three hundred impulses from the relay. It will thus be seen that the range of the settings is greatly increased without changing the design of the device but by merely employing two devices each of limited range. For example, it has been found possible to readily construct a device capable of being set for counting any number in repeat cycles up to 140. By using two such devices connected as shown in Fig. 9 the solenoid 24b can be set to operate once for each 140 times 140 operations of the relay 29 or approximately each 20,000 operations. It is to be noted that the number for which the combined devices can be set must be some number which can be factored into two numbers each less than 141. This would exclude exact counting of all prime numbers above 140 and a few other numbers which were not prime but which could not be resolved into two factors each less than 140. Within the limitation just stated the two devices are just as satisfactory as a single device built with special and complicated mechanism and gearing. It is also an added advantage that the solenoid 24 may perform some operation at a predetermined intermediate number, as every count of 15, while the solenoid 24b only operates for every count of 300. It is also to be observed that the solenoid 24 may be omitted if it is only the total count of 300 which it is desired to use for repeating some operation.

In the arrangement shown in Fig. 10 the mechanical structure of the device is identical with that of Fig. 2 but the electrical connections are different. A conductor 116c is connected to a contact 106c while a conductor 162c is connected to a contact 151c. The conductor 39 is connected to two conductors 166 and 167. The conductor 166 is connected directly to a contact 107c and the conductor 167 is connected through a switch 168 to a conductor 169 which is connected to a contact 152c. A stud 134c has a contact member 137c for making connection with the contact 106c, a contact member 138c for making connection with the contact 151c, a contact member 140c for making connection with the contact 107c, and a contact member 141c for making connection with the contact 152c. The reference numerals having the suffix c are analogous to the same reference numerals used in Fig. 2 without a suffix and read with Fig. 2 the application of Fig. 10 is clear.

In the operation of the modification shown in Fig. 10, if the switch 168 is closed the current will flow into the connections shown in Fig. 10 and out of the connections in precisely the same way as in Fig. 2 although the flow within the connections will be slightly different as will readily appear to one familiar with connection sketches. When the switch 168 is open the stud 134c will be carried back and forth from one extreme position of travel to the other in precisely the same way as in Fig. 2 but the current through the conductor 39 for operating the solenoid will flow only when the contact 107c is connected to the contact member 140c. The current will not flow through the conductor 39 when the contact 152c makes connection with the contact member 141c. It will thus be seen that the solenoid 24 will be operated once for every count of double the number which would cause an operation with the switch 168 closed. It will sometimes happen that this simple arrangement will increase the range of the device sufficiently without the necessity of resorting to the arrangement shown in Fig. 9.

While the foregoing embodiments of the invention have been described for purposes of illustration it is to be understood that various changes may be made therein without departing from the spirit and scope of the invention as defined in the subjoined claims.

We claim:

1. In a device of the character described a member mounted for unlimited rotative movement in either direction, means for moving said member step by step in either direction, means for reversing the direction of rotation of said member, contact-making means carried by said member, a second and third member each having a cylindrical surface coaxial with the axis of movement of said first-named member and over which said contact-making means is adapted to slide without interruption throughout 360 degrees and each having contact means adapted for cooperation with said contact-making means, and connections between each of said contact means and said reversing means, at least one of said two last-named members being adjustable into all angular positions throughout 360 degrees.

2. In a counting device for causing some operation external thereto periodically upon the completion of a predetermined adjustable number of counts, an operating member movable alternately in opposite directions a distance proportional to the predetermined number of counts for which adjustment has been made, means for moving said member in a forward direction, means for moving said member in a backward direction, stationary means for causing the reversal of the direction of movement of said operating member positioned so as to be in the path of but not obstructing the movement of said member and to be operated thereby at one extreme position of its travel, adjustable means for causing the reversal of the direction of movement of said operating member positioned so as to be in the path of but not obstructing the movement of said member and to be operated thereby at the other extreme position of its travel whereby the adjustable means may be changed to alter the number of counts between reversals in any position of the operating member, and connections to said stationary means and said adjustable means for causing said external operation simultaneously with said reversals.

3. In a counting device for causing some operation external thereto periodically upon the completion of a predetermined adjustable number of counts, an operating member movable alternately in opposite directions a distance proportional to the predetermined number of counts for which adjustment has been made, means for moving said member step by step in a forward direction, means for moving said member step by step in a backward direction, means for bringing into operation either one of said moving means and simultaneously taking out of operation the other of said moving means, a fixed electrical contact having connections to said last-named means for causing the operation thereof in one direction and for reversing the direction of movement of said member at one end of its travel, an adjustable electrical contact also having connections to said last-named means for causing the operation thereof in the other direction and for reversing the direction of movement of said member at the other end of its travel, and means carried by said member for causing said electrical contacts to be made when said member has reached either end of its travel and free to move by said contacts whereby said adjustable contact may be moved into any position while the operating member is in any position.

4. In a counting device for causing some operation external thereto periodically upon the completion of a predetermined adjustable number of counts, an annular member having a pair of contacts on the inner periphery thereof, a disc rotatably adjustable about its axis and mounted coaxially with respect to said annular member so as to provide an annular space therebetween throughout the full 360 degrees and having a pair of contacts on the outer periphery thereof, a counting member rotatably mounted on the same axis as said annular member and said disc and adapted to be rotated step by step, means for moving said counting member step by step alternately in opposite directions, electrically operated means for reversing the direction of rotation of said counting member, a contact stud carried by said counting member positioned within the space between said annular member and said disc and adapted to make contact with said contacts on the annular member and with said contacts on the disc, connections between said contacts and said electrically operated reversing means for causing the reversal of direction of rotation of said counting member, and other connections to said contacts for causing said external operation simultaneously with said reversals.

5. A counting device for causing some operation external thereto periodically upon the completion of a predetermined adjustable number of counts comprising, means for supplying electrical impulses to said device in accordance with the quantity to be counted, a member mounted for unlimited rotative movement in either direction, electromagnetic means operable by said electrical impulses for moving said member step by step in either direction, electromagnetic means for reversing the direction in which said impulses move said member, contact means carried by said member, a stationary member of circular form positioned so that said contact means slides thereover and having a stationary contact over which said contact means moves at a predetermined position of said movable member, an adjustable member of circular form positioned so that said contact means slides thereover and having a contact adjustable therewith over which said contact means moves at a predetermined position for each adjustment of said adjustable member, connections from said electromagnetic means for reversing the direction of movement of said movable member to said stationary contact and said adjustable contact, and connections to said stationary contact and said adjustable contact for causing said external operation simultaneously with the operation of said reversing means.

6. A counting device for causing some operation external thereto periodically upon the completion of a predetermined adjustable number of counts comprising, means for supplying electrical impulses to said device in accordance with the quantity to be counted, a member mounted for unlimited rotative movement in either direction, electromagnetic means operable by said electrical impulses for moving said member step by step in either direction, electromagnetic means for reversing the direction in which said impulses move said member, contact means carried by said member, a stationary member of circular form positioned so that said contact means slides thereover and having stationary contacts over which said contact means moves at a predetermined position of said movable member, an adjustable member of circular form positioned so that said contact means slides thereover and having contacts adjustable therewith over which said contact means moves at a predetermined position of said movable member for each adjustment of said adjustable member, connections from said electromagntic means for reversing the direction of movement of said movable member to said stationary contacts and said adjustable contacts, and connections to said stationary contacts and said adjustable contacts for causing said external operation simultaneously with the operation of said reversing means, one of said connections to either said stationary contacts or to said adjustable contacts having a switch therein whereby the simple opening of the switch will change the frequency of the external operation to one-half of its previous frequency.

7. A counting device for causing some operation external thereto periodically upon the completion of a predetermined adjustable number of counts comprising, means for supplying electrical impulses to said device in accordance with the quantity to be counted, a member mounted for unlimited rotative movement in either direction, reciprocating means for moving said member step by step, electromagnetic means operable by said electrical impulses for moving said reciprocating means in one direction, resilient means connected with said reciprocating means in opposition to said electromagnetic means for moving said reciprocating means in the opposite direction upon the cessation of the current flow, connections between said reciprocating means and said member to actuate the latter by the movement of the reciprocating means during the movement of the reciprocating means under the action of the resilient means, electromagnetic means for reversing the direction of movement of said member, contact means carried by said member, a stationary contact in the path of said contact means at the end of its travel in one direction and an adjustable contact in the path of said contact means at the other end of its travel, and connections between said source of electrical impulses through said contacts to said electromagnetic reversing means and to suitable connections for causing said external operation whereby the reversing means is operated and said external operation takes place during the movement of the reciprocating means under the action of said first-named electromagnetic means and against the action of the resilient means and whereby said rotative member is actuated by the reciprocating means while moving under the action of the resilient means and during the interval between the electrical impulses which actuate the reversing means and cause said external operation.

8. A counting device for causing some operation external thereto periodically upon the completion of a predetermined adjustable number of counts comprising, means for supplying electrical impulses to said device in accordance with the quantity to be counted, a member mounted for unlimited rotative movement in either direction, a spring-returned electromagnetically operated pawl and ratchet operable by said impulses to move the ratchet under the action of the spring, reversing-gear connections between said ratchet and said member, electromagnetic means for reversing said reversing-gear connections, contact means carried by said member, contacts at the two ends of the travel of said contact means and in the path thereof, and connections from said source of electrical impulses through said contacts to said electromagnetic reversing means and to an external circuit for causing said external operation, said member thereby being moved step by step between said impulses and the reversing-gear connections thereby being reversed and the external operation taking place during one of said impulses.

9. In a counting device, a member adapted to be moved step by step in either of two directions, means for moving said member step by step in a forward direction, means for moving said member step by step in a backward direction, means for automatically reversing the direction of movement of said member, means carried by said member for causing said automatic reversal, and a single adjustable means cooperating with said last-named means the setting of which determines the number of steps counted between reversals, said adjustable means being movable into any position from any other position independently of the position of said member.

10. In a device of the character described, a member movable in either of two opposite directions, means for moving said member step by step in one direction, means for moving said member step by step in the opposite direction, means for reversing the direction of movement of said member, electrical contacts adapted to be made by said member in one direction of travel, other electrical contacts adapted to be made by said member in the other direction of travel, connections from said contacts to said reversing means for reversing the direction of movement of said member, a conductor from each of said contacts joined together and connected by means of a third conductor to an external operating circuit, one of the conductors from said contacts having a switch therein whereby the opening or closing of said switch changes the frequency of operation of the external circuit by a ratio of two to one.

PAUL W. BIDWELL.
GEORGE M. PRENTICE.